United States Patent [19]
Christopher et al.

[11] Patent Number: 6,000,424
[45] Date of Patent: Dec. 14, 1999

[54] APPARATUS FOR EXPELLING AIR FROM A LIQUID STORAGE TANK

[75] Inventors: Delbert S. Christopher, Reklaw; James J. Mullen, Carrollton, both of Tex.

[73] Assignee: Lennox Manufacturing Inc., Marshalltown, Iowa

[21] Appl. No.: 08/654,621

[22] Filed: May 29, 1996

[51] Int. Cl.$^6$ .................................................. F16L 51/00
[52] U.S. Cl. ........................ 137/337; 137/563; 126/362
[58] Field of Search ................................... 126/362, 387; 137/563, 337

[56] References Cited

U.S. PATENT DOCUMENTS

| | | | |
|---|---|---|---|
| 2,756,739 | 7/1956 | Schaub | 126/362 |
| 3,229,683 | 1/1966 | Russel et al. | 126/362 |
| 3,688,839 | 9/1972 | Kirschner | 126/362 |
| 4,790,291 | 12/1988 | Barrett | 126/362 |
| 4,917,142 | 4/1990 | Laing et al. | 126/362 |
| 5,735,291 | 4/1998 | Kanohi | 126/362 |

*Primary Examiner*—A. Michael Chambers
*Attorney, Agent, or Firm*—W. Kirk McCord

[57] ABSTRACT

Apparatus for expelling air from a liquid storage tank, such as a hot water storage tank includes a bleed line coupled between a water circulating pump discharge conduit and a hot water discharge line emanating from tank 10. The bleed line is connected to the hot water discharge line at a location which is elevated with respect to a location where the bleed line is connected to the pump discharge conduit. The pump is operable to draw hot water from the top part of the tank and discharge it into a cold water fill line extending into the tank to enhance water circulation in the tank. Air and other gas released when water is heated in the top part of the tank are drawn from the top part of the tank and expelled via the bleed line, to prevent accumulation of air and other gas in the tank. In accordance with another aspect of the invention, an elongated tubular member is inserted into the cold water fill line. The tubular member has a bushing with a tapered surface for directing the incoming cold water into a first fluid passageway within the tubular member. A second fluid passageway is defined between the tubular member and the cold water fill line. The water circulating pump discharges hot water from the top part of the tank into the second passageway so that the hot water does not mix with the incoming cold water until the incoming cold water is injected back into the second passageway at the lower end of the tubular member.

16 Claims, 2 Drawing Sheets

APPARATUS FOR EXPELLING AIR FROM A LIQUID STORAGE TANK

TECHNICAL FIELD

This invention relates generally to liquid heating apparatus and in particular to apparatus for expelling air and other gas from a liquid storage tank, such as a hot water storage tank.

BACKGROUND ART

Apparatus for heating liquid, such as water, are well known in the art. Such apparatus typically include a tank for storing the heated liquid, a liquid fill line coupled to the tank for introducing the liquid to be heated into the tank and a heated liquid discharge line coupled to the tank for discharging heated liquid from the tank for external use, such as for domestic use and/or for space heating. One problem associated with such heating apparatus is that air and other gas are released from solution when the liquid is heated and may accumulate in the tank, particularly at the top thereof.

There is therefore a need for apparatus to prevent accumulation of air and other gases in a liquid storage tank.

SUMMARY OF INVENTION

A liquid heating system typically includes a tank for storing liquid, a heating device for heating liquid stored in the tank, a liquid fill line for introducing liquid to be heated into the tank and a heated liquid discharge line for discharging heated liquid from the tank. A circulation pump may also be provided to enhance circulation within the tank by drawing heated liquid from a top part of the tank and injecting it into the liquid fill line via a circulation conduit connecting the pump to the liquid fill line.

In accordance with the present invention, apparatus is provided for expelling air and other gas from the tank to inhibit accumulation thereof in the tank. The apparatus includes a bleed line communicating between the circulation conduit and the heated liquid discharge line, whereby air in the top part of the tank is able to escape into the heated liquid discharge line through the circulation conduit and the bleed line.

In accordance with a feature of the invention, the bleed line communicates with the heated liquid discharge line at a location which is elevated with respect to a location where the bleed line communicates with the circulation conduit, to facilitate expulsion of air and other gas from the tank via the circulation conduit and the bleed line.

In accordance with another feature of the invention, an extension member is coupled to a distal end of the heated liquid discharge line. The extension member has an opening through which the bleed line communicates with the heated liquid discharge line.

In accordance with still another feature of the invention, circulation of liquid within the tank is enhanced by providing a tubular member located in the liquid fill line to define a first fluid passageway inside the tubular member and a second fluid passageway outside the tubular member and between the tubular member and the liquid fill line, so that the first and second passageways are in concentric relationship. A flow directing member is also located in the liquid fill line for directing incoming liquid into the first passageway. The circulation pump is operable to pump heated liquid from the top part of the tank into the second passageway. The incoming liquid exits the first passageway sufficiently below the top part of the tank to prevent the incoming liquid from backing up through the liquid fill line into the pump when the pump is not operating.

In accordance with a further feature of the invention, the tubular member has a hole in an upper portion thereof to facilitate upward movement of air and other gas in the first passageway when there is no incoming liquid flowing in the first passageway.

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly depict certain features of the invention.

Figure 1:
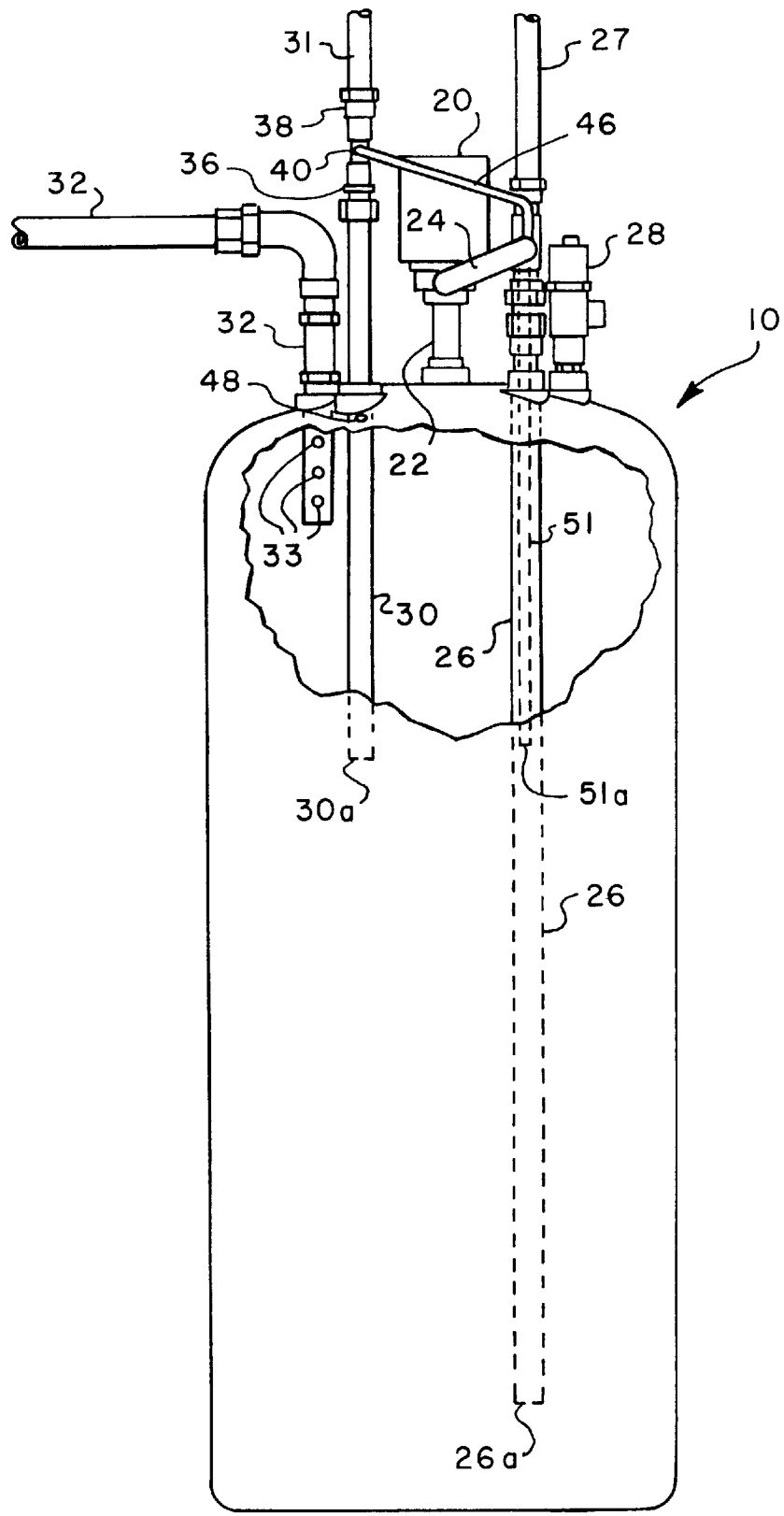
FIG. 1 is an elevation view of a hot water storage tank, a portion of which is broken away to show the interior thereof.

Referring to FIG. 1, a water heating system includes a water storage tank 10, which is preferably made of stainless steel. The water heating system is preferably a combination system of the type described in co-pending U.S. application Ser. No. 08/296,112, now U.S. Pat. No. 5,544,645, which is incorporated by reference herein, wherein heated water is used both for domestic use and for space heating. Alternatively, the water heating may be a dedicated system for providing hot water for domestic use only. A gas burner and combustion chamber (not shown) are located inside tank 10, preferably in a top part thereof, so that the hottest water will be in the top part of tank 10. A combustion air blower (not shown) is provided to supply a combustible gas-air mixture to the burner. A heat exchanger (not shown) is connected to the combustion chamber for exhausting products of combustion therefrom and for transferring heat to the surrounding water in the tank. The burner, combustion chamber, combustion air blower and heat exchanger are not shown in FIG. 1 so as to emphasize other features of the water heating system of the present invention.

A water circulating pump 20 is located outside tank 10 on a top part thereof for circulating water within tank 10. The suction side of pump 20 includes a suction conduit 22, which is in fluid communication with the interior of tank 10 at the top part thereof. The discharge side of pump 20 includes a discharge conduit 24, which is in fluid communication with a cold water fill line 26. Fill line 26 is connected to a source of potable water via a water supply line 27 and penetrates through the top of tank 10. Fill line 26 extends vertically downward through the interior of tank 10 to a position at or near the bottom of tank 10. Cold water enters tank 10 at discharge end 26a of fill line 26, so that cold water is introduced into tank 10 at or near the bottom part thereof. Discharge conduit 24 is connected to cold water fill line 26 such that pump 20 is operable to draw hot water from the top part of tank 10 and discharge it into cold water fill line 26, as will be described in greater detail hereinafter.

A temperature/pressure relief valve 28 is also located outside tank 10 on a top part thereof for relieving excess temperature and pressure therein. A hot water discharge line 30 penetrates upwardly through the top of tank 10 for discharging hot water from tank 10. Discharge line 30 is connected to an external hot water supply line 31 for supplying hot water for domestic use. Suction end 30a of discharge line 30 is located near the top of tank 10, so that the hottest water is drawn into discharge line 30 for domestic use. The pressure inside tank 10 forces hot water into discharge line 30.

A conduit 32 is provided for drawing hot water from the top part of tank 10 and supplying the hot water to an external space heating unit (not shown), such as, for example, one or more low temperature baseboard heaters, one or more radiant floor heaters, or an hydronic heat exchanger coil, or to a combination thereof. Hot water is drawn into conduit 32 through plural apertures 33. Another conduit (not shown) is provided for returning water from the external space heating unit to the top part of tank 10 to be reheated. Water for space heating is drawn from tank 10 and returned thereto by operation of another water pump (not shown) which is operatively associated with the external space heating unit.

Figure 2:
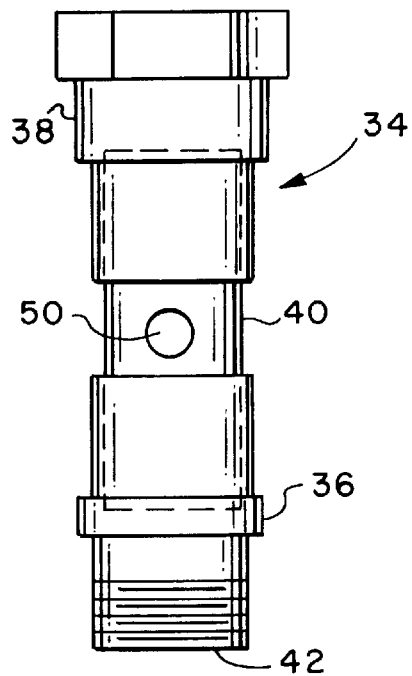
FIG. 2 is a detailed elevation view of an extension member, adapted to be connected to a hot water discharge line emanating from the tank of FIG. 1, according to the present invention.

Referring also to FIG. 2, apparatus is provided for expelling air and other gas from tank 10 into hot water discharge line 30. The apparatus includes an extension member 34 coupled to discharge line 30 at an end thereof opposite from suction end 30a. Extension member 34 has two adapters 36 and 38, respectively, with a section of tubing (preferably copper tubing) 40 therebetween. Adapter 36 is coupled to discharge line 30 by the threaded engagement of male threads 42 of adapter 36 with complementary female threads (not shown) inside discharge line 30. Adapter 38 has female threads (not shown) adapted to engage complementary male threads of hot water supply line 31.

A bleed line 46 extends between tubing 40 and discharge conduit 24 and is connected to both tubing 40 and discharge conduit 24 (preferably by soldering) such that bleed line 46 is in fluid communication with the interior of both tubing 40 and discharge conduit 24. As shown in FIG. 1, bleed line 46 is connected to tubing 40 at a location which is elevated with respect to a location where bleed line 46 is connected to discharge conduit 24, so that bleed line 46 has a generally upward slope from discharge conduit 24 to tubing 40. Tubing 40 has an opening 50, which is sized to receive the upper end of bleed line 46. Bleed line 46 has a smaller diameter than discharge conduit 24. For example, bleed line 46 may have an outside diameter of approximately 5/16 inch, while discharge conduit 24 may have an outside diameter of approximately 7/8 inch.

Pump 20 is in operation when water in tank 10 is being heated by the gas burner. When hot water for domestic use is being drawn through discharge line 30 and pump 20 is in operation, pump 20 draws hot water and air from the top part of tank 10 and discharges hot water and air through discharge conduit 24 into cold water fill line 26, to inhibit accumulation of air in the top part of tank 10. Because fluid pressure in tubing 40 is less than fluid pressure in discharge conduit 24 when pump 20 is operating, some hot water and air are drawn through bleed line 46 into tubing 40 and evacuated via hot water supply line 31, thereby further inhibiting air accumulation in the top part of tank 10. Migration of air and other gas from discharge conduit 24 into tubing 40 is enhanced by the upward slope of bleed line 46.

When pump 20 is operating, but hot water is not being drawn through discharge line 30, some air migrates upwardly through bleed line 46 into tubing 40 and some air is pumped into fill line 26. When pump 20 is not operating and hot water is not being drawn through discharge line 30, some air in the top part of tank 10 can still move upwardly through suction line 22, pump 20 and discharge conduit 24 into bleed line 46 and thence upwardly into hot water supply line 31, so that accumulation of air and other gas in the top of tank 10 is inhibited even when pump 20 is not operating. Discharge line 30 has a small (e.g., 1/8 inch) anti-siphon hole 48 just below where discharge line 30 penetrates the top of tank 10. Hole 48 allows air in the top of tank 10 to escape through line 30 into supply line 31.

Figure 3:
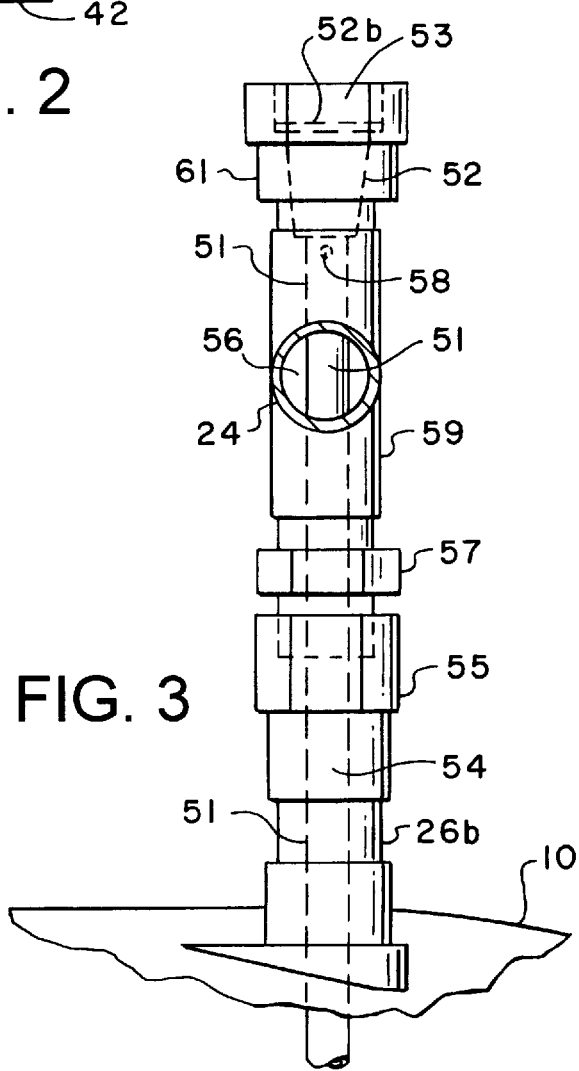
FIG. 3 is a detailed elevation view of a cold water fill line emanating from the tank of FIG. 1, according to the present invention.
Figure 4:
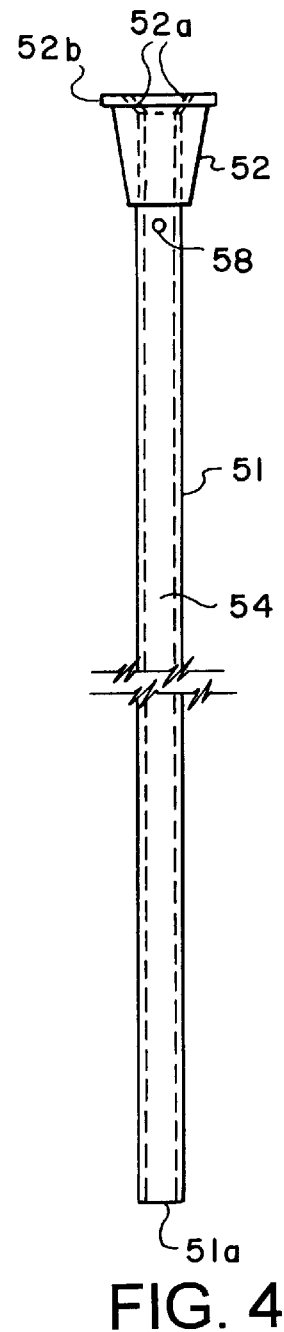
FIG. 4 is a detailed elevation view of a tubular member, which is located in the cold water fill line of FIG. 3, according to the present invention.

Referring to FIGS. 1, 3 and 4, an elongated tubular member 51 (FIG. 4) is located in cold water fill line 26 (FIG. 1). A bushing 52 defines an upper end of tubular member 51. Bushing 52 has an enlarged upper portion 52b, which is wider than bore 53 of fill line 26, to locate tubular member 51 within fill line 26. Bushing 52 has a downwardly and inwardly tapered upper surface 52a for channeling incoming cold water into a first fluid passageway 54 inside tubular member 51. When tubular member 51 is inserted into cold water fill line 26, a second fluid passageway 56 is defined outside tubular member 51 and between tubular member 51 and cold water fill line 26. Discharge conduit 24 is shown in cross-section in FIG. 3 to show tubular member 51 inside fill line 26. First and second passageways 54 and 56 are in concentric relationship, such that second fluid passageway 56 has an annular cross-section. Tubular member 51 has an anti-siphon hole 58 located just below bushing 52 to permit air bubbles to move upwardly through first fluid passageway 54 and into cold water supply line 27 (FIG. 1) when there is no incoming cold water.

Referring to FIG. 3, plural fittings are interposed between a stub section 26b of fill line 26 and cold water supply line 27 (FIG. 1) outside tank 10. Two adapters 55, 57 are coupled between stub section 26b and a tube section 59 and another adapter 61 is coupled to tube section 59 at an opposite end thereof from where adapter 57 is coupled to tube section 59. Adapter 61 is adapted to be coupled to water supply line 27 (FIG. 1). Discharge conduit 24 is connected to tube section 59, as can be best seen in FIG. 3. Tube section 59 has an opening therein, through which discharge conduit 24 communicates with passageway 56 inside fill line 26.

In operation, pump 20 pumps hot water from the top part of tank 10 into passageway 56. The hot water flows downwardly through passageway 56 in a parallel flow path with the incoming cold water in passageway 54 inside tubular member 51 so that the cold and hot water do not mix until the cold water exits passageway 54 at bottom end 51a of tubular member 51. Tubular member 51 extends far enough down into tank 10 that incoming cold water exits passageway 54 sufficiently low enough in cold water fill line 26 that cold water is for all practical purposes unable to back up into pump 20 through passageway 54 when pump 20 is not operating. Therefore, a backflow-prevention device, such as a check valve, is not required and the flow capacity of pump 20 is greater than what it would be if a backflow-prevention device, such as a check valve, were interposed in discharge conduit 24.

The best mode for carrying out the invention has now been described in detail. Since changes in and modifications to the above-described best mode may be made without departing from the nature, spirit or scope of the invention, the invention is not to be limited to said details, but only by the appended claims and their equivalents.

We claim:

1. Apparatus for heating liquid, comprising:

a tank for storing liquid, said tank having a top part and a bottom part;

a heating device for heating liquid stored in said tank;

a liquid fill line for introducing liquid to be heated into said tank;

a liquid discharge line for discharging heated liquid from said tank;

a liquid circulation device for drawing heated liquid from said tank and discharging heated liquid into said fill line, said liquid circulation device including a circulation conduit communicating between said top part of tank and said fill line; and a bleed line communicating between said circulation conduit and said discharge line, whereby air in said circulation conduit is able to move through said bleed line into said discharge line.

2. Apparatus of claim 1 wherein said bleed line communicates with said discharge line at a location which is elevated with respect to a location where said bleed line communicates with said circulation conduit.

3. Apparatus of claim 1 wherein said liquid circulation device includes a pump adapted to draw heated liquid from a top part of said tank and to discharge heated liquid into said circulation conduit.

4. Apparatus of claim 1 further including an extension member coupled at one end thereof to a distal end of said discharge line and being adapted to be coupled at an opposite end thereof to an external heated liquid supply line, said extension member having an opening through which said bleed line communicates with said discharge line.

5. Apparatus of claim 1 wherein said fill line has a tubular member located therein to define a first fluid passageway inside said tubular member and a second fluid passageway outside said tubular member and between said tubular member and said fill line, said first and second passageways being in concentric relationship, said apparatus further including a flow directing member for directing incoming liquid into said first passageway, said liquid circulation device being adapted to discharge heated liquid into said second passageway in generally the same direction as the incoming liquid in said first passageway.

6. Apparatus of claim 5 wherein said tubular member has a hole in an upper portion thereof to facilitate upward movement of air in said first passageway when incoming liquid is not flowing through said first passageway.

7. Apparatus of claim 5 wherein said flow directing member is a bushing having a tapered surface for channeling incoming liquid into said first passageway.

8. Apparatus of claim 5 wherein said bushing is located at one end of said tubular member, said bushing and said tubular member being located in said liquid fill line.

9. Apparatus of claim 1 wherein said liquid discharge line penetrates through said top part of said tank, said discharge line having a hole located just below where said discharge line penetrates through said top part of said tank to facilitate escape of air from said top part of said tank into said discharge line.

10. In a water heating system having a tank for storing water, a heating device for heating water stored in the tank, a cold water fill line for introducing water to be heated into the tank at a bottom part thereof, a hot water discharge line for discharging heated water from the tank at a top part thereof, and a pump having a suction conduit communicating with the top part of the tank for drawing heated water from the top part and a discharge conduit communicating with the cold water fill line for discharging heated water into the cold water fill line, apparatus for expelling air from the tank, said apparatus including a bleed line communicating between the discharge conduit and the hot water discharge line, whereby air in the top part of the tank is able to escape into the hot water discharge line through the pump discharge conduit and said bleed line.

11. Apparatus of claim 10 wherein said bleed line communicates with the hot water discharge line at the location which is elevated with respect to a location where said bleed line communicates with the pump discharge conduit.

12. Apparatus of claim 11 further including an extension member coupled at one end thereof to a distal end of the hot water discharge line and being adapted to be coupled at an opposite end thereof to an external hot water supply line, said extension member having an opening through which said bleed line communicates with the hot water discharge line.

13. In a water heating system having a tank for storing water, a heating device for heating water stored in the tank, a cold water fill line for introducing water to be heated into the tank at a bottom part thereof, a hot water discharge line for discharging heated water from the tank at a top part thereof, and a pump having a suction conduit communicating with the top part of the tank for drawing heated water from the top part and a discharge conduit communicating with the cold water fill line for discharging heated water into the cold water fill line, apparatus for enhancing water circulation in the tank, said apparatus including a tubular member located in the cold water fill line to define a first fluid passageway inside said tubular member and a second fluid passageway outside said tubular member and between said tubular member and the cold water fill line, said first and second passageways being in concentric relationship, said apparatus further including a flow directing member for directing incoming cold water into said first passageway, the pump being adapted to discharge heated water into said second passageway in generally the same direction as the incoming liquid in said first passageway.

14. Apparatus of claim 13 wherein said tubular member has a hole in an upper portion thereof to facilitate upward movement of air in said first passageway when incoming cold water is not flowing through said first passageway.

15. Apparatus of claim 13 wherein said flow directing member is a bushing having a tapered surface for channeling incoming cold water into said first passageway.

16. Apparatus of claim 15 wherein said bushing is located at one end of said tubular member, said bushing and said tubular member being located in the cold water fill line.

* * * * *